United States Patent
Rosser

(10) Patent No.: US 9,856,928 B2
(45) Date of Patent: Jan. 2, 2018

(54) MAGNETICALLY HINGED OVERRUNNING CLUTCH

(71) Applicant: Roy Rosser, Monmouth Juncton, NJ (US)

(72) Inventor: Roy Rosser, Monmouth Juncton, NJ (US)

(*) Notice: Subject to any disclaimer, the term of this patent is extended or adjusted under 35 U.S.C. 154(b) by 28 days.

(21) Appl. No.: 15/444,840

(22) Filed: Feb. 28, 2017

(65) Prior Publication Data

US 2017/0343059 A1 Nov. 30, 2017

Related U.S. Application Data

(60) Provisional application No. 62/343,044, filed on May 30, 2016, provisional application No. 62/439,221, filed on Dec. 27, 2016, provisional application No. 62/463,679, filed on Feb. 26, 2017.

(51) Int. Cl.
| | |
|---|---|
| *F16D 41/07* | (2006.01) |
| *F16D 27/14* | (2006.01) |
| *F16D 27/01* | (2006.01) |
| *F16D 27/02* | (2006.01) |

(52) U.S. Cl.
CPC ............ *F16D 41/07* (2013.01); *F16D 27/01* (2013.01); *F16D 27/02* (2013.01); *F16D 27/14* (2013.01)

(58) Field of Classification Search
None
See application file for complete search history.

(56) References Cited

U.S. PATENT DOCUMENTS

| | | | | |
|---|---|---|---|---|
| 2,300,223 | A * | 10/1942 | Hottenroth, Jr. ....... | F16D 41/066 188/82.84 |
| 2,389,961 | A * | 11/1945 | Dodge .................... | F16D 41/07 192/45.1 |
| 3,164,234 | A * | 1/1965 | Tamarin .................. | F16D 41/07 192/36 |
| 4,754,859 | A * | 7/1988 | Ouchi .................... | F16D 41/066 192/45.008 |
| 6,410,999 | B1 * | 6/2002 | Vranish ................... | H01L 41/12 310/26 |
| 9,212,708 | B2 | 12/2015 | Spahr | |
| 2002/0005325 | A1 * | 1/2002 | Yamada ................ | F16D 41/067 192/38 |

(Continued)

*Primary Examiner* — Colby M Hansen
(74) *Attorney, Agent, or Firm* — r.r (princeton); Roy Rosser

(57) ABSTRACT

A magnetically hinged, overrunning clutch is disclosed. Sprags containing rare-earth permanent magnets, and arranged in pairs of opposite magnetic orientation, are located within the gap between the inner surface of a hollow, circularly cylindrical shaft and the external surface of a smaller diameter, second circularly cylindrical shaft. Pairs of rare-earth permanent magnets encircling the second cylindrical shaft are located at, or just beneath, the surface of the shaft and are arranged in pairs having alternating magnetic orientation. The sprags are cylinders having a pseudo-spiral cross-section and are sized, and the ferromagnetic region located, such that when the sprags are attracted to the shaft-magnets, the first shaft may be rotated with respect to the second shaft in a first, overrunning direction of rotation, but the first shaft does not rotate with respect to the second shaft in an opposite, or lock-up direction.

9 Claims, 3 Drawing Sheets

(56) References Cited

U.S. PATENT DOCUMENTS

2015/0285318 A1\* 10/2015 Lin .................. F16D 27/01
  192/45.001
2016/0010702 A1\* 1/2016 Kitayama ............... F16D 27/14
  192/66.1

\* cited by examiner

MAGNETICALLY HINGED OVERRUNNING CLUTCH

CROSS-REFERENCE TO RELATED APPLICATIONS

This application claims priority to U.S. Patent Application Ser. No. 62/343,044 filed on May 30, 2016, U.S. Patent Application Ser. No. 62/439,221 filed on Dec. 27, 2016 and to U.S. Patent Application Ser. No. 62/463,679 filed on Feb. 26, 2017 the contents of all of which are hereby fully incorporated herein by reference.

BACKGROUND OF THE INVENTION

(1) Field of the Invention

The present invention is directed to the technical field of engineering, particularly to overrunning clutches, and more particularly, to magnetically hinged overrunning clutches.

(2) Description of the Related Art

The technical problem of providing an effective overrunning clutch, i.e., a coupling between rotating shafts that allows motion between the shafts when a first shaft is rotating faster than a second, but locks the shafts for transmission of torque when the second shaft is rotating faster than the first, is a well-known problem inherent in the technical field of general engineering.

Overrunning clutches have numerous practical applications including providing a free-wheeling function for bicycles. A free-wheel device allows cyclists, who apply torque to the wheel by propelling pedals in a circular motion with their feet, to then also "coast", i.e., to continue to travel, but with their feet and the pedals stationary while the bicycle wheels continue to rotate. Without an overrunning clutch, the rear wheel, which is continuing to turn, would cause the pedals to also turn, forcing the pedals—and the cyclist's feet—to continue to move.

In gas powered automobiles, overrunning clutches allow electric motors to be engaged to start the engine, but to quickly disengage when the engine fires, and so avoid the faster running engine from damaging the electric motor by spinning it more quickly than it is designed to turn.

And in conveyor belt systems, the overrunning clutches allow the belt to operate in one direction, but prevent accidental backsliding of the conveyor in the other direction. This is important when the conveyors are, for instance, being used to take heavy loads up an incline as is often the case in industries such as the mining industry.

There are a variety of well-known methods for implementing overrunning clutches, such as, but not limited to, so called "dog clutches", roller-wedge clutches and sprag clutches. However, most of the known designs are either constrained by a tradeoff between the maximum torque that can be transmitted and the speed of engagement of the clutch, or between the maximum torque and the amount of free-wheeling friction. Moreover, existing high quality overrunning clutches tend to require mechanical springing of the elements which can make them difficult to manufacture, difficult to assemble and difficult to maintain. There is, therefore, a need for a simple, yet very effective, overrunning clutch that has a rapid pickup, can transmit high torques and has a low freewheeling friction that is also easy to design, easy to manufacture, easy to assemble and easy to maintain, i.e., for a simple, effective but robust overrunning clutch.

The relevant prior art includes:

US Patent Application no. 20150285318 published by LIN; Yu-Tsai on Oct. 8, 2015 entitled "Unidirectional Clutch Device" that describes a unidirectional clutch device that has a driving board, multiple permanent magnets, and multiple clutching elements. The driving board has an axle hole and multiple holding recesses. The holding recesses are defined in the driving board and are arranged around and communicate with the axle hole. Each holding recess has a long end having a radial width and a narrow end having a radial width smaller than that of the long end. The permanent magnets are mounted on the driving board and are located at positions adjacent to the narrow ends of the holding recesses. The clutching elements are rotatably mounted respectively in the holding recesses and are made of a magnetically conductive material. Each clutching element is moveable in a corresponding one of the holding recesses toward the narrow end of the corresponding holding recess by an attraction of a corresponding one of the permanent magnets.

US Patent Application no. 20140060992 published by Stefan Spahr et al. on Mar. 6, 2014 entitled "Hub for at Least Partially Muscle-Powered Vehicles" that describes a hub for at least partially muscle-powered vehicles having a hub axle, a hub body, a rotatable driving device, and a freewheel device. The freewheel device includes a first and a second engagement component cooperating with one another having at least one axial toothing each. The freewheel device is biased to the engaging position via a magnetic biasing device. A first magnetic device biases the first engagement component and a second magnetic device biases the second engagement component to the engaging position. At least one magnetic component comprises a carrier unit and a multitude of magnetic units disposed thereat.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive magnetically hinged, overrunning clutch is disclosed.

In a preferred embodiment, the magnetically hinged, overrunning clutch may include two rotatable shafts that may be co-axially aligned. Two or more sprags may be located within a gap between an external surface of the first shaft and an internal surface of the second shaft. The first shaft may also include one or more pairs of magnets that may be arranged so that in each pair, the magnetic fields may be aligned in opposite directions. Each of the sprags may have a ferromagnetic region. The sprags may be shaped and sized, and the ferromagnetic region located, such that when the sprags are disposed between the two shafts and attracted to the shaft-magnets, the first shaft may be rotated with respect to the second shaft in a first, overrunning direction of rotation, but not in an opposite, or lock-up direction.

In a further preferred embodiment of the invention, the sprags may also contain magnets, and the sprags may also come in pairs in which each sprag of the pair has the magnetic field aligned in an opposite direction.

The shaft-magnets may, for instance, be arranged in pairs, one being in a south-down orientation with the adjacent shaft-magnet being in a north-down orientation. A south-down orientation may, for instance, consist of the magnetic axis of the shaft-magnet being oriented such that the south-seeking end of the magnet is directed towards the axis of rotation of the shaft. Similarly, a north-down orientation may consist of the magnetic axis being oriented such that the north-seeking end of the magnet is directed towards the axis of rotation of the shaft.

The sprag-magnets may then be located and oriented in the sprags such that a first type of sprag may have the magnet oriented such that, when it is located adjacent to one of the north-down shaft-magnets, the sprag may be attracted towards the north-down shaft-magnet and may pivot toward a lockup configuration of the clutch. Similarly, a second type of sprag may have a magnet located and oriented such that when it is located adjacent to a south-down shaft-magnet, it may be attracted toward the south-down shaft-magnet and may also pivot toward a lockup configuration of the clutch.

In a preferred embodiment, the sprags may be in the form of cylinders in which the cross-section has at least two portions of a spiral, as is common practice with mechanically sprung sprag overrunning clutches.

In a further preferred embodiment of the invention, the sprags may be cylindrical but have pseudo-spiral cross sections. A pseudo-spiral may, for instance, be constructed of portions of a circle of different radii. Such pseudo-spiral sprags may, for instance, be easier to design, to draw, to machine and to manufacture.

The sprag and shaft-magnets may, for instance, be rare-earth magnets such as, but not limited to, rare-earth magnets containing Neodymium.

In further embodiments of the present invention, one or more of the shaft-magnets may also, or instead, be an electro-magnet, and may be used to turn the lockup condition on or off.

Therefore, the present invention succeeds in conferring the following, and others not mentioned, desirable and useful benefits and objectives:

It is an object of the present invention to provide a simple, effective and robust overrunning clutch that avoids the complexity of mechanical springing of the sprags.

It is another object of the present invention to provide an overrunning clutch that can be manufactured with looser tolerances and from a greater range of materials than conventionally mechanically sprung sprag overrunning clutches.

Yet another object of the present invention is to provide inexpensive, but highly effective, overrunning clutches that have both rapid uptake and low overrunning loss, or friction, and are easy to design, easy to manufacture, easy to assemble and easy to maintain.

DETAILED DESCRIPTION OF THE INVENTION

Figure 1:
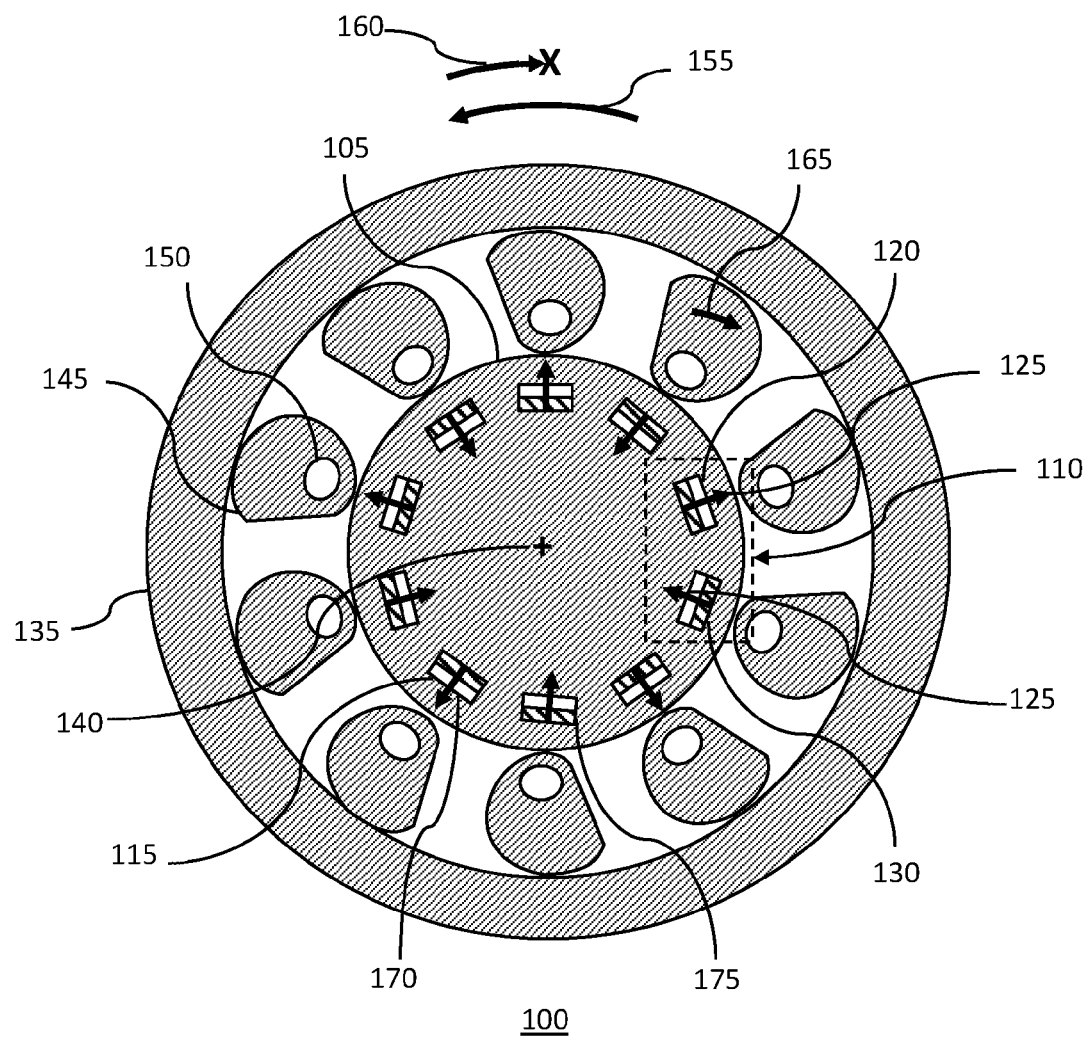
FIG. 1 shows a schematic cross-section of one embodiment of a magnetically hinged, overrunning clutch of the present invention.

The preferred embodiments of the present invention will now be described in more detail with reference to the drawings in which identical elements in the various figures are, as far as possible, identified with the same reference numerals. These embodiments are provided by way of explanation of the present invention, which is not, however, intended to be limited thereto. Those of ordinary skill in the art may appreciate upon reading the present specification and viewing the present drawings that various modifications and variations may be made thereto without departing from the spirit of the invention.

FIG. 1 shows a schematic cross-section of one embodiment of a magnetically hinged, overrunning clutch of the present invention.

The magnetically hinged, overrunning clutch 100 may consist of a first, or inner, shaft 105 co-axially located within a second, or outer, shaft 135, i.e., they may both have their axis of rotation 140 on a common line. A number of sprags 145 may be located between the two shafts and the object of the arrangement may be to provide a device in which, when the outer shaft is rotated with respect to the inner shaft in a first direction 155, the shafts may rotate past each other, or overrun. However, the arrangement of the device is such that, when the outer shaft is rotated in a second, opposite direction 160, the two shafts may be locked to each other and torque may be transmitted from one shaft to the other. In well-known, prior art sprag clutches this is typically done by making the sprags with surfaces that are one or more parts of a spiral and then mechanically springing the sprags together so that they are always mechanically lightly sprung towards a lockup orientation.

In the present invention, sprags that may have spiral or pseudo-spiral cross-sections, may instead be magnetically hinged so as to always be lightly pivoted towards a lockup orientation.

In a preferred embodiment, this magnetic hinging may be accomplished by having a number of shaft-magnets 115 as part of the first shaft 105. These may be arranged as pairs 110 of adjacent shaft-magnets in which a first shaft-magnet 120 of the pair has a magnetic axis 125 oriented in an opposite direction to the magnetic axis 125 in an adjacent second shaft-magnet 130 of the pair. The sprags 145 may contain a ferromagnetic region 150 located such that combined with the shape of the sprag, that when it is attracted to one of the shaft-magnets 115, the sprag pivots 165 toward a lockup configuration, i.e., a configuration that, if maintained firmly, locks the two shafts together.

Having the shaft-magnets and the sprag-magnets arranged in alternating pairs may result in the magnet fluxes of the magnets forming localized loops of magnetic flux. This may have the benefit of avoiding the formation of regions of inappropriately oriented magnetic attraction or repulsion in the region between the shaft-magnets. Such in-between regions of inappropriately oriented magnetic attraction or repulsion may, for instance, allow the sprags with a ferromagnetic region to become locked down in an orientation such that they may no longer be able to act as required for an effective overrunning clutch.

The pairs 110 of adjacent shaft-magnets may be arranged such that a one having a south-down orientation 170 is always adjacent to another one having a north-down orientation 175. A south-down orientation 170 may be one in which the shaft-magnetic has its magnetic axis oriented such that a south-seeking end of the magnet is directed toward the axis of rotation of the shaft. A north-down orientation 175, may be one in which the shaft-magnet has its magnetic axis oriented such that a north-seeking end is directed towards the axis of rotation of the shaft.

The shaft-magnets may, for instance, be rare-earth magnets such as, but not limited to, to the Neodymium rare-earth magnets supplied by, for instance, K&J Magnetics, Inc. of Pipersville, Pa. In alternate embodiments, the shaft-magnets may also be wholly, or in part, electro-magnets and may be arranged so that a lockup configuration may be turned on or off, i.e., that the magnetically hinged, overrunning clutch may be switched from allowing freewheeling in either relative rotation of the shafts, to one in which freewheeling only occurs in one direction of relative rotation.

The ferromagnetic region 150 may, for instance, be a region of any of the well-known ferromagnetic materials such as, but not limited to, iron, nickel, cobalt, steel or 400 series, ferritic stainless steel, or some combination thereof. The remainder of the sprag, and the two shafts, may be made of any suitable non-magnetic material such as, but not limited to, aluminum, ceramics, plastics, nylon, or 300 series, austenitic stainless steel, or some combination thereof.

Figure 2:
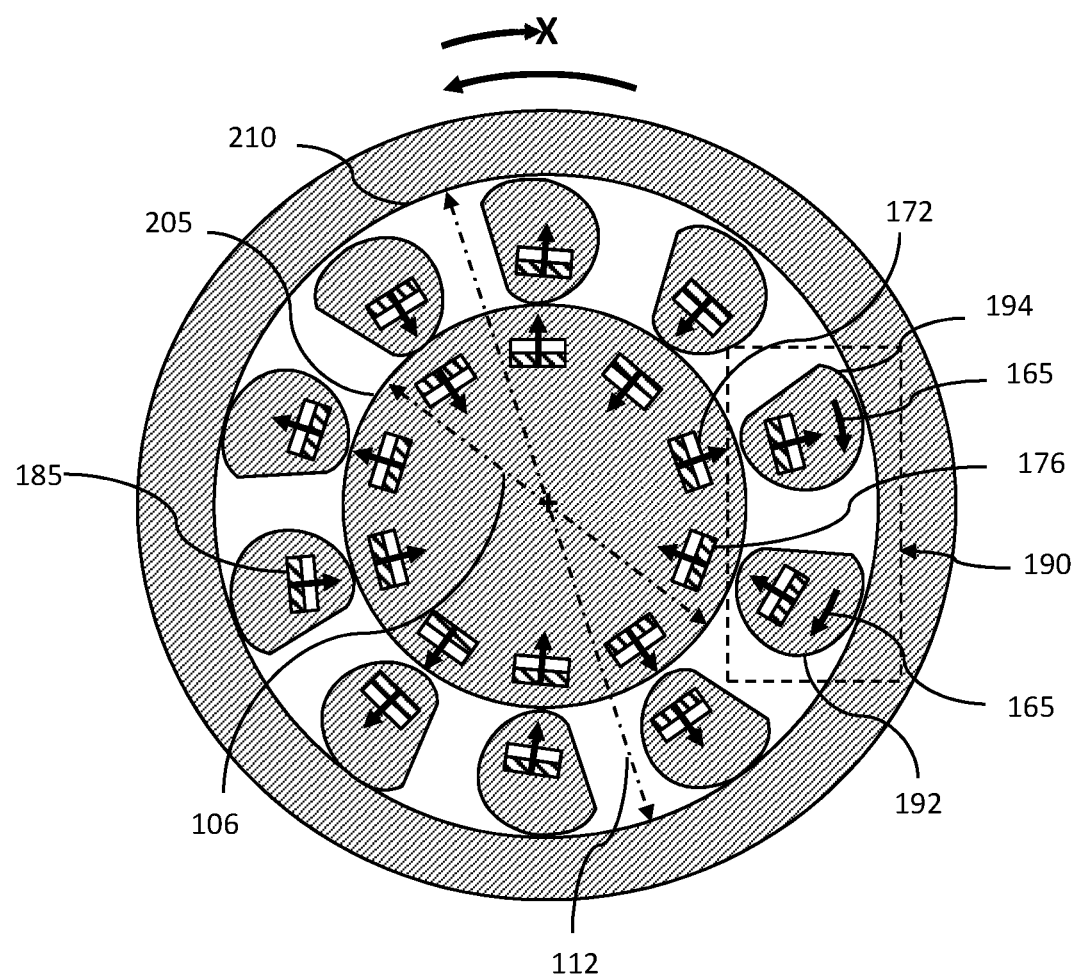
FIG. 2 shows a schematic cross-section of a further preferred embodiment of a magnetically hinged, overrunning clutch of the present invention.

FIG. 2 shows a schematic cross-section of one preferred embodiment of a magnetically hinged, overrunning clutch of the present invention.

As shown in FIG. 2, the ferromagnetic region of the sprag may also, or instead, be a magnet. The sprags may be arranged in pairs of sprags 190. In such a pair, there may be a first sprag 192 that may have a sprag-magnet 185 located and oriented such that when the first sprag is located adjacent to a north-down oriented shaft-magnet 176, the first sprag may be attracted toward the north-down oriented shaft-magnet 176, and may pivot 165 toward a lockup configuration. In the pair, there may also be a second sprag 194 that may have a sprag-magnet 185 located and oriented such that when the second sprag is located adjacent to a south-down oriented shaft-magnet 172, the second sprag may be attracted toward the south-down oriented shaft-magnet 172, and may also pivot 165 toward a lockup configuration.

As shown in FIG. 2, the sprags may be disposed between a first, circularly cylindrical external surface 205 of the inner shaft and a second, circularly cylindrical internal surface 210 of the outer shaft. The sprag may be sized to fit the space between the shafts, i.e., to fit a space that is the difference between a first, external diameter 106 of the inner shaft and a second, internal diameter 112 of the outer shaft.

Having the shaft-magnets and the sprag-magnets arranged in alternating pairs may result in the magnet fluxes of the magnets forming localized loops of magnetic flux. This may have the benefit of avoiding the formation of regions of inappropriately oriented magnetic attraction or repulsion in the region between the shaft-magnets. Such in-between regions of inappropriately oriented magnetic attraction or repulsion may allow the sprags with magnets to become locked down in an orientation such that they are no longer able to act as required for an effective overrunning clutch.

Having the alternating magnetic orientation may also have the added benefit of helping prevent locked-up sprags from sliding around the inner shaft when large torques are being applied to the outer shaft in the lockup direction. This prevention of sliding may occur because, while the sprag is attracted to the shaft-magnet that it may be hinged to, it may be repelled by the adjacent shaft-magnet.

The sprag-magnets may also, like the shaft-magnets, be rare-earth permanent magnets such as, but not limited to, to the Neodymium rare-earth permanent magnets supplied by, for instance, K&J Magnetics, Inc. of Pipersville, Pa. In one embodiment of the present invention, it may be desirable to have the magnets be rectangular shaped, rare-earth block permanent magnets made of alloys that include Neodymium, and have a pull-force of between 0.5 lbs. and 5 lbs. The size of the magnets and their pull force may be selected based on the size of the shaft diameters and the magnitude of the torque forces being transmitted.

Figure 3:
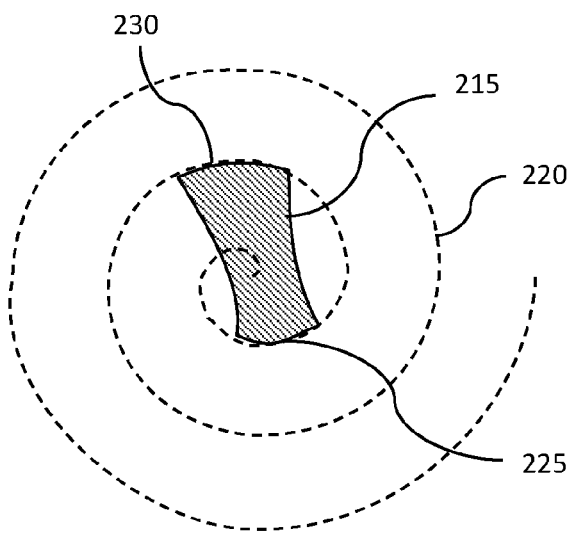
FIG. 3 shows a schematic cross-section of an exemplary spiral sprag.

FIG. 3 shows a schematic cross-section of an exemplary spiral sprag.

The spiral shown in FIG. 3 is an Archimedean spiral 220. The spiral sprag 215 may, as shown in FIG. 3, incorporate a first portion 225 of a spiral and a second portion 230 of the same spiral. Such spiral sprags are well-known and well understood.

The Archimedean spiral may be represented in polar form by the equation:

$$r(\theta) = a \cdot \theta \qquad (1)$$

where r is the distance from a reference point and θ is the angle from a reference direction and a is a constant. A more general form of a spiral may be represented in polar form by the equation:

$$r(\theta) = f(\theta) \qquad (2)$$

where f(θ) represents some function of θ such as, but not limited to, $\theta^2$ or ln(θ).

One of ordinary skill in the art will appreciate that many of these other spirals such as, but not limited to, the logarithmic spiral, may also be used as a suitable basis for designing the cross-section of a functional sprag.

Figure 4:
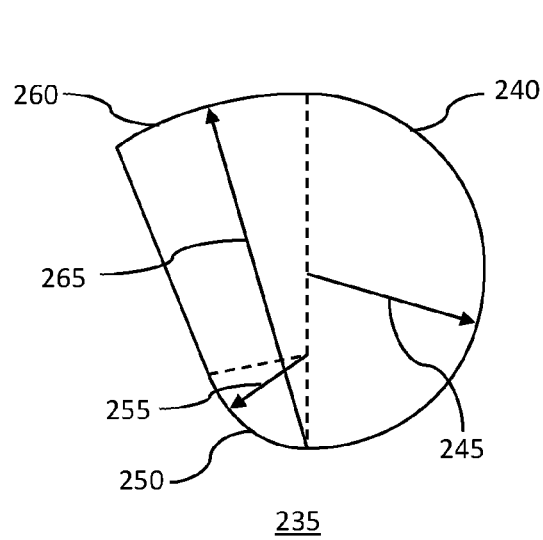
FIG. 4 shows a schematic cross-section of one embodiment of a pseudo-spiral sprag of the present invention.

FIG. 4 shows a schematic cross-section of one embodiment of a pseudo-spiral sprag of the present invention.

Although spirals may be mathematically represented very elegantly in polar coordinates, they are more cumbersome to represent and manipulate in the Cartesian coordinates generally used in CAD/CAM design and machining software. For these, and other, reasons, it may be useful to design sprags that are pseudo-spirals and made up of regions having arcs that are each a part of a circle but with the different parts being from circles having different radii.

The pseudo-spiral 235 shaped cross-section shown in FIG. 4 is, for instance, made up of three arcs, the arc defining the initial surface 250, the arc defining the mid-surface 240 and the arc defining the final surface 260.

The pseudo-spiral 235 shaped cross-section shown in FIG. 4 has the mid-surface radius 245, that defines the mid-surface 240 arc, set equal to half the difference between the first, external diameter 106 (FIG. 2) and the second, internal diameter 112 (FIG. 2), of the shafts of the magnetically hinged, overrunning clutch. The initial surface radius 255 may then be equal to half of the mid-surface radius 245 and the final surface radius 265 to twice the mid-surface radius 245.

Other pseudo-spiral 235 shaped cross-section designs may also be suitable for use as sprags. For instance, any design in which the initial surface radius 255 is less than the mid-surface radius 245 and the final surface radius 265 is greater than the mid-surface radius 245, but less than or equal to twice the mid-surface radius 245, may function as a sprag in a magnetically hinged, overrunning clutch, albeit maybe with a different effectiveness or a different efficiency that those of the design illustrated in FIG. 4.

Figure 5:
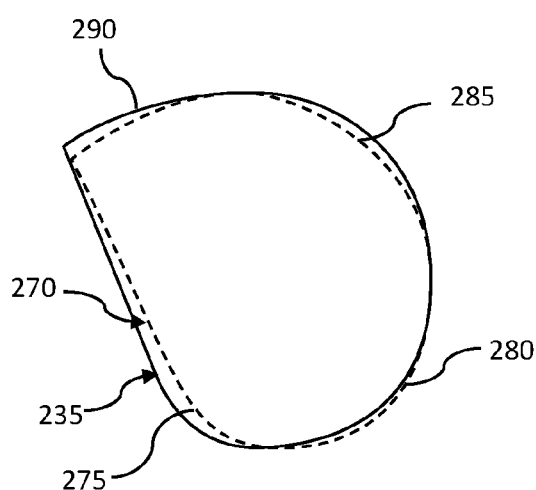
FIG. 5 shows a comparison of schematic cross-sections of an exemplary spiral sprag and an exemplary pseudo-spiral sprag.

FIG. 5 shows a comparison of schematic cross-sections of an exemplary spiral sprag and an exemplary pseudo-spiral sprag.

The pseudo-spiral 235 shaped cross-section shown in FIG. 5 is a 3-surface pseudo-spiral having radii of r, 2r and 4r, as discussed above and also shown in FIG. 4. The Archimedean spiral shaped cross-section 270, shown as a dotted line in FIG. 5, is an Archimedean spiral that has been matched to have the same height in neutral orientation, i.e., when the top and bottom of the sprag are just in contact at both the top and the bottom with the shaft surfaces that they may be disposed between, as the pseudo-spiral to which it is being compared.

From the similarity of the two cross-sections, it may be inferred that their action as sprags in a magnetically hinged, overrunning clutch may be similarly effective. There are, however, minor differences and it may be possible to improve the effectiveness of the sprags by, for instance, constructing a pseudo-spiral cross section that may, for instance, be made up of a spiral initial section 275, a spiral initial mid-section 280, a spiral final mid-section 285 and a pseudo-spiral final section 290.

Although the examples described above have the shaft-magnets associated with the inner shaft, one of ordinary skill in the art will, however, appreciate that designs in which the shaft-magnets are instead associated with the outer, hollow shaft may also be made, and may also function effectively as magnetically hinged, overrunning clutches.

Although this invention has been described with a certain degree of particularity, it is to be understood that the present disclosure has been made only by way of illustration and that numerous changes in the details of construction and arrangement of parts may be resorted to without departing from the spirit and the scope of the invention.

The invention claimed is:

1. A magnetically hinged, overrunning clutch, comprising,
    a first shaft containing one or more pairs of adjacent shaft-magnets in which a first shaft-magnet has a magnetic axis oriented in an opposite direction to a second shaft-magnet;
    a second shaft having an axis of rotation located co-axially with respect to an axis of rotation said first shaft;
    two or more sprags disposed between said first and second shafts, each of said sprags comprising a sprag-magnet located such that each of said sprags is attracted toward one of said shaft-magnets, and wherein said sprags are shaped and sized, and have said sprag-magnet located, such that when said second shaft is turned in a first direction relative to said first shaft, it overruns, and when said second shaft is turned in a second, opposite direction relative to said first shaft, it locks-up.

2. The magnetically hinged, overrunning clutch of claim 1 wherein, said pairs of adjacent shaft-magnets comprise said first shaft-magnet having a south-down orientation, said south-down orientation comprising having its magnetic axis oriented such that a south-seeking end is directed toward said axis of rotation of said first shaft, and said second shaft-magnet having a north-down orientation, said north-down orientation comprising having its magnetic axis oriented such that a north-seeking end is directed towards said axis of rotation of said first shaft;
    further comprising pairs of said sprags, and wherein a first of said pair of sprags comprises a first sprag comprising a sprag-magnet oriented such that when said first sprag is located adjacent one of said north-down shaft-magnets, said sprag is attracted to pivot toward said lockup configuration, and a second sprag comprising said sprag-magnet oriented such that when said second sprag is located adjacent a south-down shaft-magnet, said sprag is attracted to pivot toward said lockup configuration.

3. The magnetically hinged, overrunning clutch of claim 2 wherein each of said sprags is a spiral sprag comprising a cylinder having a cross-section comprising a first portion of a spiral and a second portion of said spiral.

4. The magnetically hinged, overrunning clutch of claim 2 wherein each of said sprags is a cylinder having a pseudo-spiral shaped cross-section.

5. The magnetically hinged, overrunning clutch of claim 4, wherein, said first shaft comprises a first, circularly cylindrical external surface having a first, external diameter, and said second shaft comprises a second, circularly cylindrical internal surface having a second, internal diameter, and wherein said sprags are disposed between said first and second surfaces, and
    wherein said pseudo-spiral shaped cross-section comprises three surfaces, a mid-surface having a mid-surface radius equal to half the difference between said first external diameter and said second internal diameter, an initial surface having an initial surface radius equal to half said mid-surface radius and a final surface having a final surface radius equal to twice said mid-surface radius.

6. The magnetically hinged, overrunning clutch of claim 1, wherein at least one of said shaft-magnets comprises an electro-magnet.

7. The magnetically hinged, overrunning clutch of claim 1, wherein at least one of said shaft-magnets comprises a rare-earth permanent magnet.

8. The magnetically hinged, overrunning clutch of claim 1, wherein at least one of said shaft-magnets comprises a rare-earth permanent magnet comprising Neodymium.

9. The magnetically hinged, overrunning clutch of claim 1, wherein at least one of said shaft-magnets comprises a rectangular shaped, rare-earth block permanent magnet comprising Neodymium, and having a pull-force of between 0.5 lbs. and 5 lbs.

* * * * *